(12) United States Patent
Yeluri

(10) Patent No.: US 7,089,405 B2
(45) Date of Patent: Aug. 8, 2006

(54) INDEX-BASED SCOREBOARDING SYSTEM AND METHOD

(75) Inventor: Sharada Yeluri, San Jose, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 525 days.

(21) Appl. No.: 09/813,498

(22) Filed: Mar. 21, 2001

(65) Prior Publication Data

US 2002/0174320 A1 Nov. 21, 2002

(51) Int. Cl.
*G06F 9/312* (2006.01)
*G06F 9/445* (2006.01)

(52) U.S. Cl. .......................... 712/217; 712/26
(58) Field of Classification Search ................ 711/133, 711/144, 128, 135, 125, 221, 145; 712/217, 712/219, 226, 26, 27, 230, 248
See application file for complete search history.

(56) References Cited

U.S. PATENT DOCUMENTS

| | | | |
|---|---|---|---|
| 5,305,458 A * | 4/1994 | Motomura et al. .......... 711/207 |
| 5,564,034 A * | 10/1996 | Miyake ...................... 711/128 |
| 5,621,896 A * | 4/1997 | Burgess et al. .............. 711/118 |
| 5,881,264 A * | 3/1999 | Kurosawa .................... 712/217 |
| 6,016,542 A * | 1/2000 | Gottlieb et al. ............. 712/225 |
| 6,473,832 B1 * | 10/2002 | Ramagopal et al. ........ 711/118 |
| 6,487,639 B1 * | 11/2002 | Lipasti ....................... 711/137 |

* cited by examiner

*Primary Examiner*—Daniel H. Pan
(74) *Attorney, Agent, or Firm*—Zagorin O'Brien Graham LLP

(57) ABSTRACT

A computer system includes a scoreboard mechanism that provides a locking scheme to preserve data dependencies. An index is used to unlock (i.e., invalidate) scoreboard entries when a terminating event associated with that entry's instruction has occurred. For a load instruction, the terminating event that triggers invalidation for a particular scoreboard entry is the return of the load data. An index is used to identify the scoreboard entry associated with the returning load instruction, since load instructions may return load data out of order.

15 Claims, 6 Drawing Sheets

INDEX-BASED SCOREBOARDING SYSTEM AND METHOD

BACKGROUND OF THE INVENTION

1. Field of the Invention

The present invention relates to computing devices and, more particularly, to a computing device that provides index-based scoreboarding.

2. Description of the Related Art

In multiple-thread processing, an automated system for various processing applications may handle multiple events or processes concurrently. A single process is termed a thread of control, or "thread", and is the basic unit of operation of independent dynamic action within the system. A program has at least one thread. A system performing concurrent operations typically has many threads, some of which are transitory and others enduring. Systems that execute among multiple processors allow for true concurrent threads. Single-processor systems can only have illusory concurrent threads, typically attained by time-slicing of processor execution, shared among a plurality of threads.

Some programming languages are particularly designed to support multiple-threading. One such language is the Java™ programming language that is advantageously executed using an abstract computing machine, the Java Virtual Machine™. A Java Virtual Machine™ is capable of supporting multiple threads of execution at one time. The multiple threads independently execute Java code that operates on Java values and objects residing in a shared main memory. The multiple threads may be supported using multiple hardware processors, by time-slicing a single hardware processor, or by time-slicing many hardware processors. In 1990 programmers at Sun Microsystems developed a universal programming language, eventually known as "the Java™ programming language". Java™, Sun, Sun Microsystems and the Sun Logo are trademarks or registered trademarks of Sun Microsystems, Inc. in the United States and other countries. All SPARC trademarks, including UltraSPARC I and UltraSPARC II, are used under license and are trademarks of SPARC International, Inc. in the United States and other countries. Products bearing SPARC trademarks are based upon an architecture developed by Sun Microsystems, Inc.

SUMMARY OF THE INVENTION

A computer system includes a scoreboard mechanism that provides a locking scheme to preserve data dependencies. An index is used to unlock (i.e., invalidate) scoreboard entries when a terminating event associated with that entry's instruction has occurred. For a load instruction, the terminating event that triggers invalidation for a particular scoreboard entry is the return of the load data. An index is used to identify the scoreboard entry associated with the returning load instruction, since load instructions may return load data out of order.

In at least one embodiment, a method for implementing a scoreboard is provided. The method comprises associating an instruction with an index value, associating the instruction with a scoreboard entry corresponding to the index value, receiving an indication that a terminating event associated with the instruction has occurred, and invalidating the scoreboard entry.

In at least one other embodiment, a computer system is provided. The computer system comprises a main memory and at least one processing unit that is coupled to the main memory. In addition, the computer system comprises a module, coupled to the main memory, that associates an instruction with an index value, a module that associates the instruction with a scoreboard entry corresponding to the index value, a module that is capable of receiving an indication that a terminating event associated with the instruction has occurred, and a module that invalidates the scoreboard entry.

BRIEF DESCRIPTION OF THE DRAWINGS

The present invention may be better understood, and its numerous objects, features, and advantages made apparent to those skilled in the art by referencing the accompanying drawings.

The use of the same reference symbols in drawings indicates identical items unless otherwise noted.

DETAILED DESCRIPTION

Figure 1:
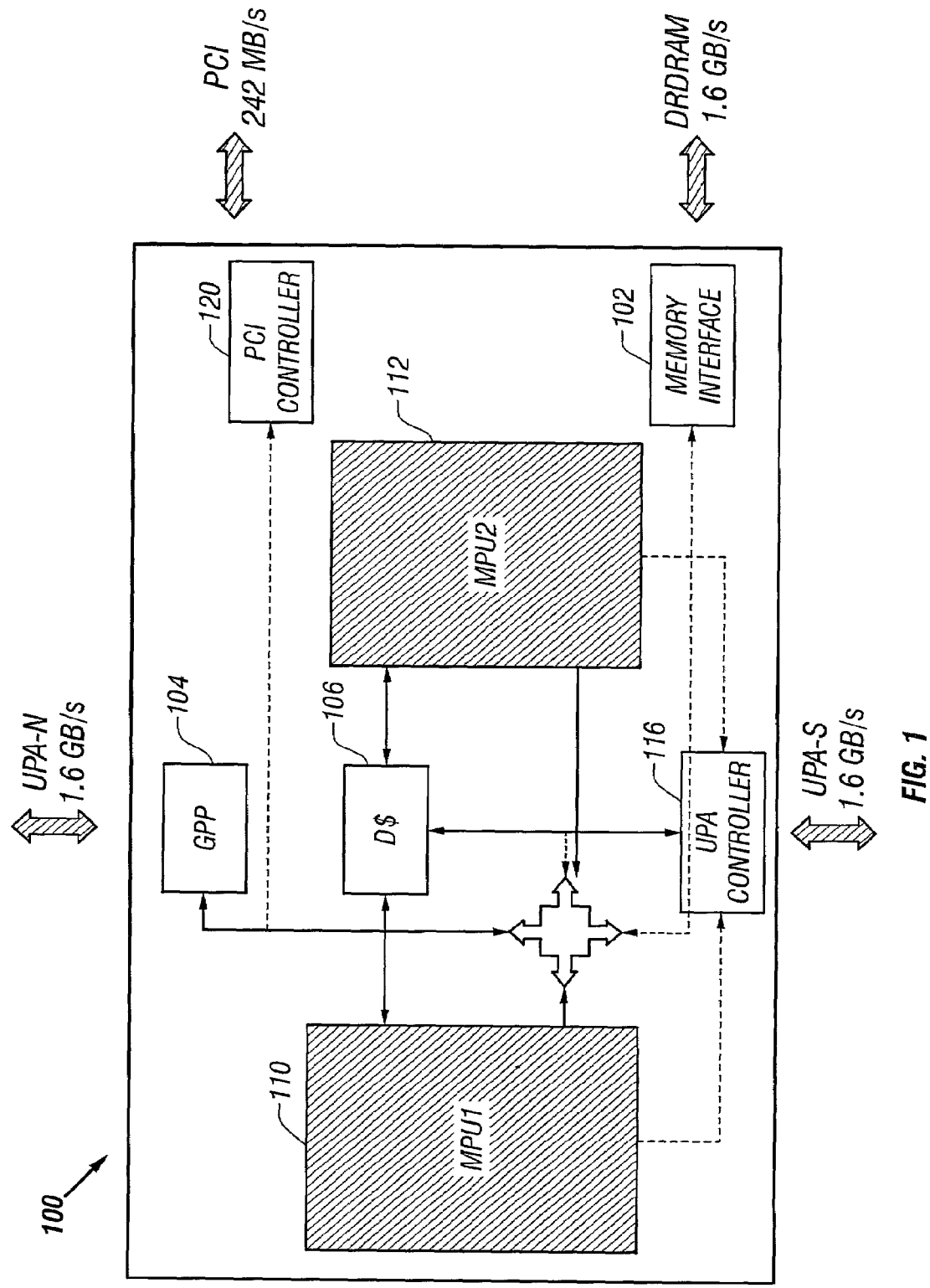
FIG. 1 is a schematic block diagram illustrating one embodiment of a multiple-thread processor.

Referring to FIG. 1, a schematic block diagram illustrates a processor 100 having an improved architecture for multiple-thread operation on the basis of a highly parallel structure including multiple independent parallel execution paths, shown herein as two media processing units 110 and 112. The execution paths execute in parallel across threads and include a multiple-instruction parallel pathway within a thread. The multiple independent parallel execution paths include functional units executing an instruction set having special data-handling instructions that are advantageous in a multiple-thread environment.

The multiple-threading architecture of the processor 100 is advantageous for usage in executing multiple-threaded applications using a language such as the Java™ language running under a multiple-threaded operating system on a multiple-threaded Java Virtual Machine™. The illustrative processor 100 includes two independent processor elements, the media processing units 110 and 112, forming two independent parallel execution paths. A language that supports multiple threads, such as the Java™ programming language generates two threads that respectively execute in the two parallel execution paths with very little overhead incurred. The special instructions executed by the multiple-threaded processor include instructions for accessing arrays and instructions that support garbage collection.

A single integrated circuit chip implementation of a processor 100 includes a memory interface 102 for interfacing with a main memory, a geometry decompressor 104, the two media processing units 110 and 112, a shared data cache (D$) 106, and several interface controllers. The interface controllers support an interactive graphics environment with real-time constraints by integrating fundamental components of memory, graphics, and input/output bridge functionality on a single die. The components are mutually linked and closely linked to the processor core with high bandwidth, low-latency communication channels to manage multiple high-bandwidth data streams efficiently and with a low response time. The interface controllers include an UltraPort Architecture Interconnect (UPA) controller 116 and a peripheral component interconnect (PCI) controller 120. The illustrative memory interface 102 is a direct Rambus dynamic RAM (DRDRAM) controller. The shared data cache 106 is a dual-ported storage that is shared among the media processing units 110 and 112 with one port allocated to each media processing unit. The shared data cache 106 is four-way set associative, follows a write-back protocol, and supports hits in the fill buffer (not shown). The shared data cache 106 allows fast data sharing and eliminates the need for a complex, error-prone cache coherency protocol between the media processing units 110 and 112.

The processor 100 issues and retires instructions in order. However, processor 100 implements dynamic instruction rescheduling and speculative execution of load instructions, which allows instructions to execute and complete out of order. Even though the operations may finish out of order, and therefore may generate exceptions out of order, the processor 100 nonetheless provides precise trap handling and maintains the appearance of in-order execution following a trap.

Figure 2:
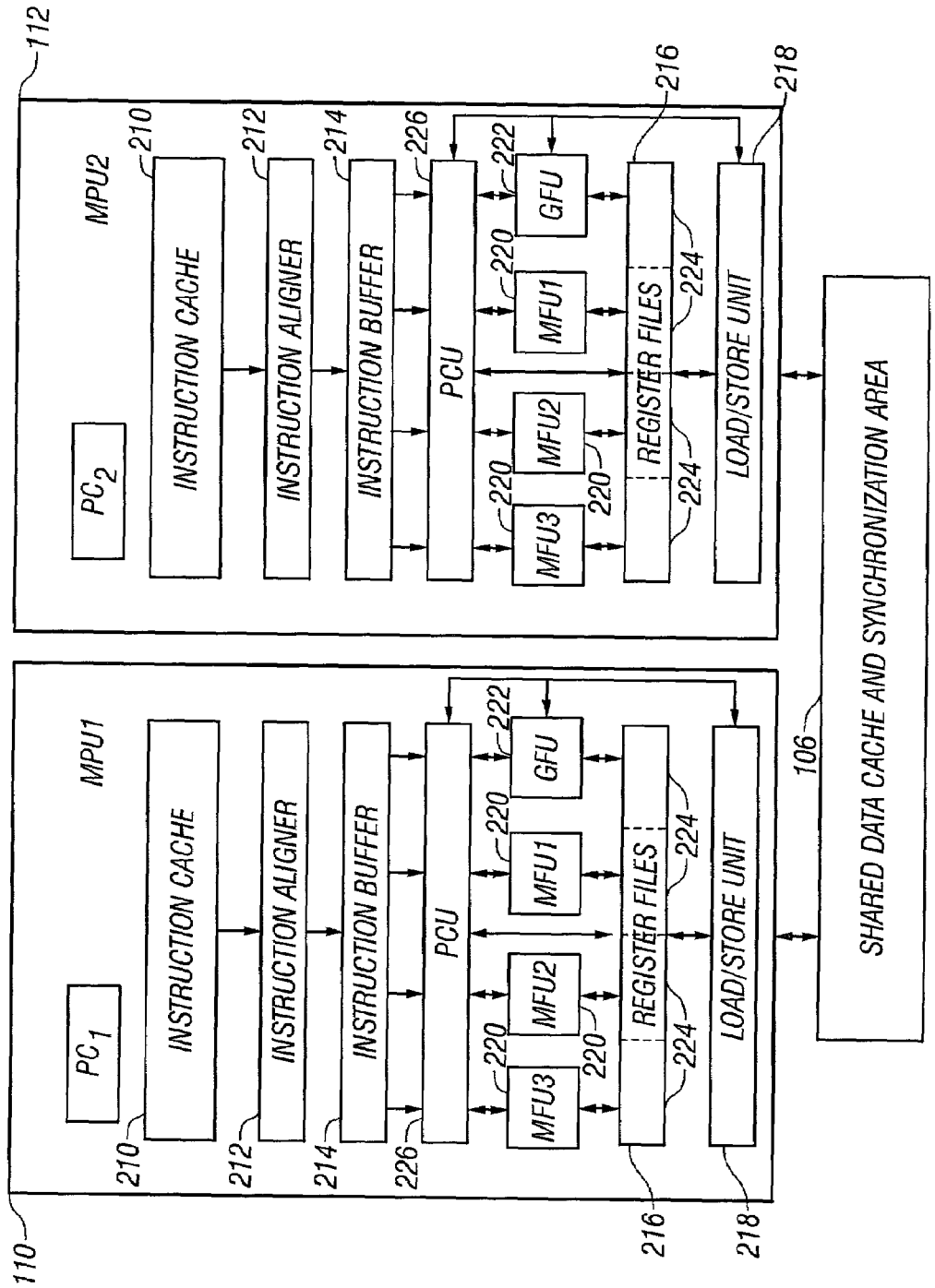
FIG. 2 is a schematic block diagram showing the core of one embodiment of a multi-thread processor.

Referring to FIG. 2, a schematic block diagram shows the core of the processor 100. The media processing units 110 and 112 each include an instruction cache 210, an instruction aligner 212, an instruction buffer 214, a pipeline control unit (PCU) 226, a split register file 216, a plurality of functional units, and a load/store unit 218. In the illustrative processor 100, the media processing units 110 and 112 use a plurality of functional units for executing instructions. The functional units for a media processing units 110, 112 include three media functional units (MFU) 220 and one general functional unit (GFU) 222.

An individual independent parallel execution path 110 or 112 has operational units including instruction supply blocks and instruction preparation blocks, functional units 220 and 222, and a register file 216 that are separate and independent from the operational units of other paths of the multiple independent parallel execution paths. The instruction supply blocks include a separate instruction cache 210 for the individual independent parallel execution paths, however the multiple independent parallel execution paths share a single data cache 106 since multiple threads sometimes share data. The data cache 106 is dual-ported, allowing data access in both execution paths 110 and 112 in a single cycle. Sharing of the data cache 106 among independent processor elements 110 and 112 advantageously simplifies data handling, avoiding a need for a cache coordination protocol and the overhead incurred in controlling the protocol.

In addition to the instruction cache 210, the instruction supply blocks in an execution path include the instruction aligner 212, and the instruction buffer 214 that precisely format and align a full instruction group of four instructions to prepare to access the register file 216. An individual execution path has a single register file 216 that is physically split into multiple register file segments 224, each of which is associated with a particular functional unit of the multiple functional units. At any point in time, the register file segments as allocated to each functional unit each contain the same content. A multi-ported register file is typically metal limited to the area consumed by the circuit, which is proportional with the square of the number of ports. The processor 100 (FIG. 1) has a register file structure divided into a plurality of separate and independent register files to form a layout structure with an improved layout efficiency. The read ports of the total register file structure 216 are allocated among the separate and individual register files. Each of the separate and individual register files has write ports that correspond to the total number of write ports in the total register file structure. Writes are fully broadcast so that all of the separate and individual register files are coherent.

The media functional units 220 are multiple single-instruction-multiple-data (MSIMD) media functional units. Each of the media functional units 220 is capable of processing parallel 16-bit components. Various parallel 16-bit operations supply the single-instruction-multiple-data capability for the processor 100 including add, multiply-add, shift, compare, and the like. The media functional units 220 operate in combination as tightly coupled digital signal processors (DSPs). Each media functional unit 220 has a separate and individual sub-instruction stream, but all three media functional units 220 execute synchronously so that the sub-instructions progress lock-step through pipeline stages.

During operation of the processor 100, traps may occur. A trap is a vectored transfer of control to privileged software, taken by the processor 100 in response to the presence of certain conditions. Traps may occur due to internal events or external events. An external condition that will cause a trap is an interrupt. An interrupt is a request for service presented to the functional unit by a device external to the functional unit. An interrupt is asynchronous to the instruction stream of the functional unit receiving the interrupt. Internally, a trap may occur due to an exception. An exception is triggered by the execution of an instruction within the functional unit. An exception is a condition that makes it impossible for a functional unit to continue executing the current instruction stream without software intervention. The functional unit may be set to ignore some exceptions. If, however, the functional unit has not been set to ignore an exception, or if the exception is of a type that must not be ignored, then the exception will cause a trap.

One specific type of trap is a "precise" trap, which is generated by an attempt to execute an instruction. An instruction may generate an exception if it encounters some condition that makes it impossible to complete normal execution. Such an exception may, in turn, generate a precise trap. It is induced by a particular instruction and occurs before any program-visible state of the processor 100 has been changed by the trap-inducing instruction. For load instructions, this means that the trap occurs before the results of the trap-inducing load are written to the register file.

When instructions are generated for processor 100, either by hand or by compiler, the instructions are organized into packets of instructions. The instruction packet may contain from one to N instructions, where N is the number of functional units included in the media processing units 110, 112. In at least one embodiment, the instruction packets include four instructions. Each instruction packet either executes to completion or causes an exception.

If any instruction generates a recoverable error, the processor 100 provides precise trap handling by returning to its machine state at the time the exception occurred, and resuming operation. When a precise trap occurs, the processor 100 ensures a precise state by completing execution of all instruction packets issued before the one that induced the trap. In addition, the processor 100 prevents all instruction packets that issued after that one that induced the trap from completing execution, even if they finished out of order before the trap-inducing instruction. The processor 100, therefore, restores itself to its state at the time of the exception. After such restoration, execution may be resumed. Operation may either be resumed from the trapping instruction or from the instruction following the trapping instruction. In this manner the processor 100 provides that instructions that finish out of order with respect to other packet instructions, or other packets, and then generate an exception, will nonetheless allow the processor 100 to resume operation at a precise state, as long as the error is a recoverable error (i.e., the error does not prevent restoration of the exception-time machine state).

Figure 3:
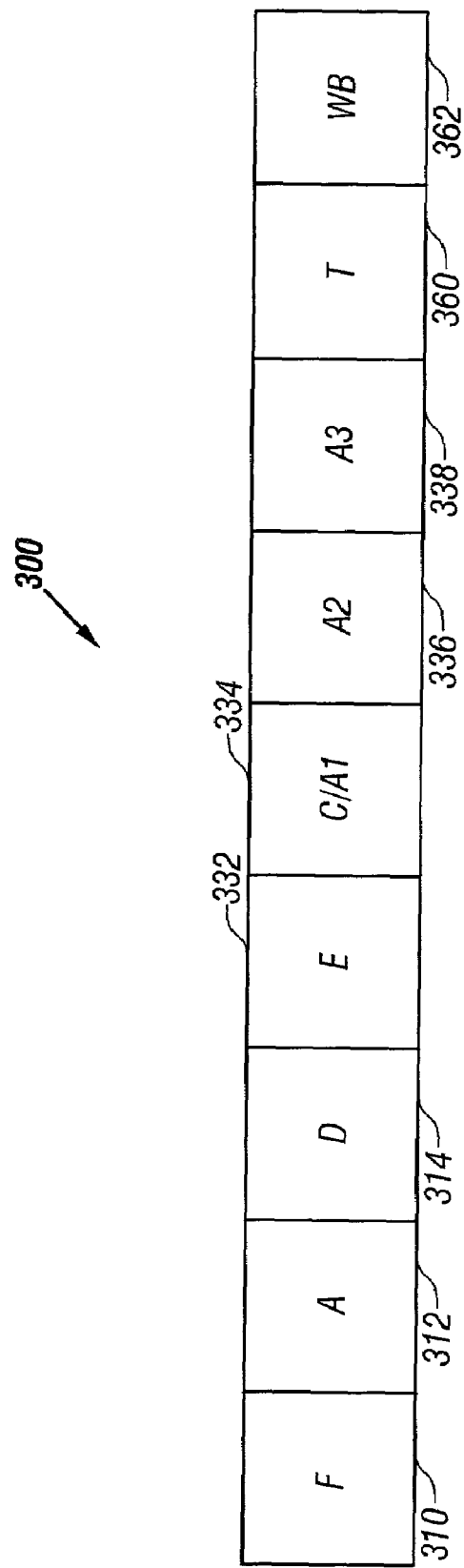
FIG. 3 is a schematic timing diagram illustrating one embodiment of a dedicated load/store pipeline.

FIG. 3 is relevant to a discussion of precise trap handling for load instructions, it being understood that the load instructions may be scheduled speculatively and may also be scheduled to execute out of order. Processor 100 maintains a dedicated load/store pipe 300 for processing load and store memory operations. FIG. 3 is a schematic timing diagram illustrating one embodiment of the dedicated load/store pipe 300. The load/store pipe 300 includes nine sequential stages, including three initiating stages, a plurality of execution stages, and two terminating stages.

Referring to FIGS. 2 and 3, the operation of the GFU load/store pipe 300 is controlled, in at least one embodiment, by the Pipe Control Unit (PCU) 226. The first of the initiating stages of the load/store pipeline 300 is a fetch stage 310 (F stage). During the F stage 310, the processor 100 fetches instructions from the instruction cache 210. The fetched instructions are aligned in the instruction aligner 212 and forwarded to the instruction buffer 214 during an align stage 312 (A stage), the second stage of the initiating stages.

In the third stage of the initiating stages, decoding stage 314 (D stage), the PCU 226 decodes the fetched and aligned instruction out of the instruction packet. During the D stage 314 the PCU 226 sends information concerning the current load instruction to the LSU 218. The four register file segments 224 each hold either floating-point data or integer data. The register file 216 is read in the decoding (D) stage 314.

Also during the D stage 314, the scoreboard 600 (FIG. 6) is read and updated. The scoreboard 600 is a structure with information concerning unfinished loads and long latency instructions. An unfinished load instruction is an instruction whose scoreboard entry is valid but that has not yet returned its load data. All instructions access the scoreboard 600 in the D Stage 314 in order to check for dependencies. When a new instruction enters the D stage 314, it compares its source and destination register operands with all of the scoreboard entries. If a match is found, the scoreboard 600 provides a hardware interlock between any unfinished load or long latency operation and a younger instruction that has data/output dependency with the unfinished load or long latency operation. In such case, the younger instruction is stalled in the D stage 314 until the unfinished load or long latency instruction's scoreboard entry is invalidated. The younger instruction is stalled until a terminating event occurs in relation to the unfinished load or long latency operation. For a load operation, the terminating event is the return of the load data from the data cache or from memory. For a long latency operation, the terminating event that triggers invalidation of that instruction's scoreboard entry occurs when the long latency operation enters the A4, or T, stage 360 without being bumped.

If a match is not found, then the new instruction is enters the scoreboard 600 at the first invalid scoreboard entry corresponding to load instructions. The number of entries in the scoreboard allocated for unfinished loads is equal to the number of entries in the load buffer 400 (FIG. 4) of the LSU 218, described below.

In at least one embodiment, the scoreboard contains 5 load instruction entries. Each scoreboard entry may include various fields. For a load instruction, the scoreboard entry includes a 5-bit stage field that indicates how old the unfinished instruction is. This stage field is similar to the load buffer status word 410 (FIG. 4) discussed below. The stage bits are shifted right by one position as each pipeline stage executes. If a trap is detected before the load instruction's stage field indicates the WB stage 362 (1B'0000'), then the scoreboard entry is invalidated.

Following the decoding stage 314, the execution stages are performed. In the first execution stage, the E stage 332, the GFU 222 calculates the address of each load and store instruction. Also during the E stage 332, all load and store instructions in the instruction packet are sent to the load/store unit (LSU) 218 for execution.

Figure 6:
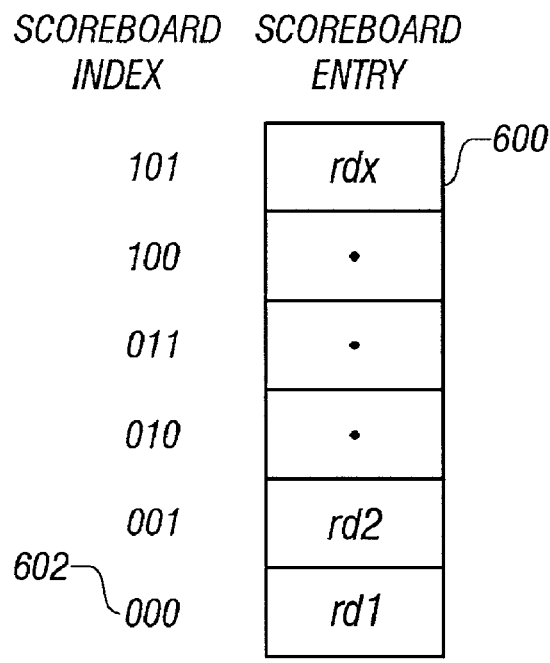
FIG. 6 is a schematic diagram illustrating a scoreboard wherein each scoreboard entry space is associated with an index.
Figure 7:
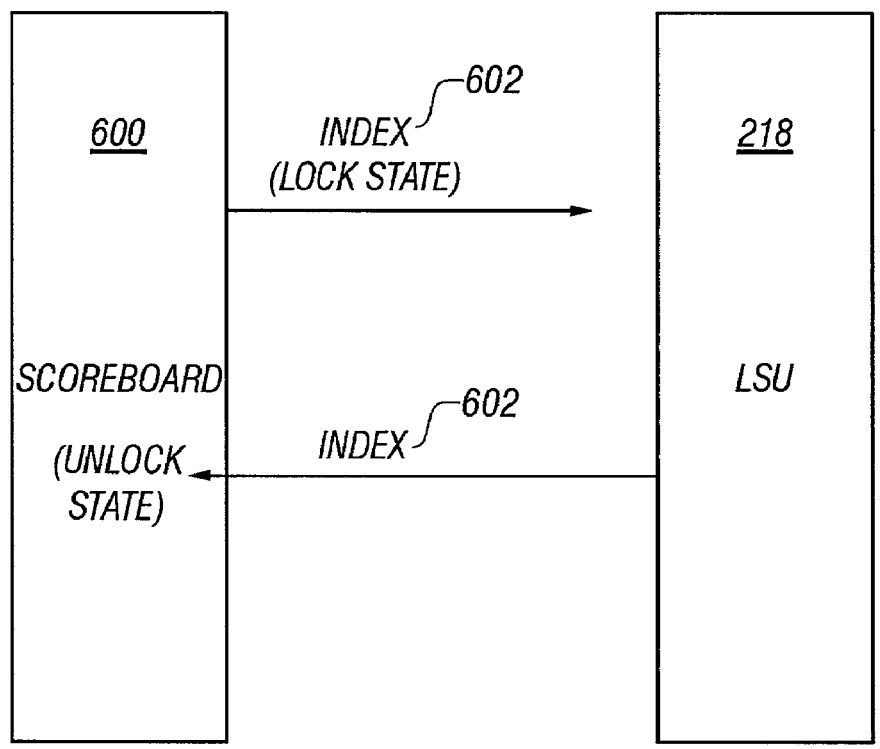
FIG. 7 is a schematic diagram illustrating at least one embodiment of a method of performing indexed scoreboarding.

FIGS. 6 and 7 illustrate that, when the load instruction is sent to the LSU 218 for execution, the index of the load instruction's scoreboard entry is also sent to the LSU 218. The LSU 218 keeps track of the index along with the load instruction.

Figure 4:
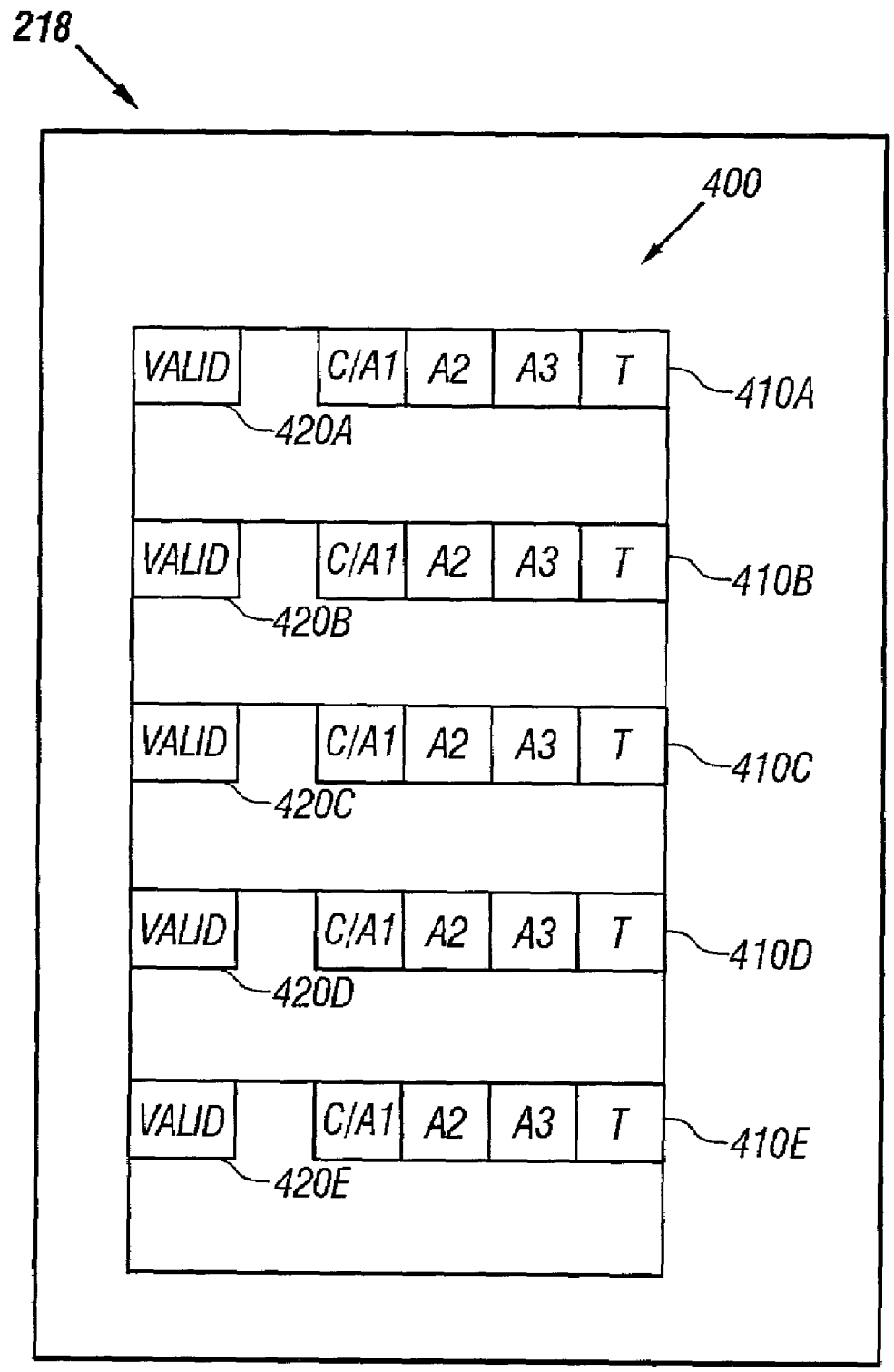
FIG. 4 is a block diagram of at least one embodiment of a load/store unit.

Referring to FIGS. 3 and 4, processing of load instructions during the remaining pipeline stages 334, 336, 338, 360, 362 is handled as follows. From the E stage 332 forward to the T stage 360, the LSU 218 keeps track of the load instruction's age. When forwarded to the LSU 218 in the E stage, the load instructions are placed into the load buffer 400 of the LSU 218. In at least one embodiment, the load buffer 400 has five entries and is therefore capable of maintaining up to five load instructions. Five entries are required because, in at least one embodiment, processor 100 allows one hit under four misses (described immediately below). In order to achieve this, 5 load entries are supported in the load buffer 400 and five load entries are supported by the scoreboard 600, described above.

Regarding a "hit under miss," reference is made to FIG. 2. When the LSU 218 attempts to access an item of information requested in a load operation, the item is either already present in the data cache 106 or not. If present, a cache "hit" has occurred. If the item is not in the data cache 106 when requested by the LSU 218, a cache "miss" occurs. After a cache miss occurs, the information requested by the LSU 218 must then be retrieved from memory and brought into the data cache 106 so that it may be accessed by the LSU 218. This search for an item of information that is not stored in the data cache 106 after a cache miss is a relatively time-consuming process. Processor 100 allows for a later-submitted load instruction that "hits" to obtain information from the data cache 106 before an earlier submitted load instruction that suffers a cache miss. This situation is referred to as a "hit under miss".

FIGS. 3, 4, and 6 relate to load instruction processing during the execution stages of the load/store pipe 300. Along with each load instruction, the LSU 218 keeps track of whether or not the instruction is valid and the load instruction's pipeline age. The LSU 218 also keeps track of the load instruction's scoreboard entry index 602. The valid bit 420 indicates that the load instruction has not been canceled due to a trap. In other words, resetting the valid bit effectively cancels the load instruction. The age information is kept in a status word 410. Each status word 410A, 410B, 410C, 410D, and 410E includes four stage bits, each stage bit corresponding to one of the C/A1, A2, A3, or T pipeline stages. The LSU 218 detects the transition from one pipeline stage to the next and, upon each transition, shifts the stage bits to the right by one position. The age of a load instruction is tracked in the status word 410 as indicated below in Table 1.

TABLE 1

| Stage Bits | C | A2 | A3 | T |
|---|---|---|---|---|
| C stage | 1 | 0 | 0 | 0 |
| A2 stage | 0 | 1 | 0 | 0 |
| A3 stage | 0 | 0 | 1 | 0 |
| T stage | 0 | 0 | 0 | 1 |

The LSU 218 accesses the data cache 106 in the C/A1 stage 334 of the load/store pipeline 300. If the load hits the data cache 106, data returns from the data cache 106 and is forwarded to the PCU 226 in the same cycle. The LSU 218 also sends to the PCU 226 the load instruction's scoreboard entry index 602 and the status word 410 with the age of the load. In the case where the load hits the data cache 106 in the C/A1 Stage 334, the status word will reflect a value of 1B'1000', indicating that the age of the load corresponds to the C/A1 pipeline stage 334. On such a cache hit, load data returns to the PCU 226 during the same C/A1 stage 334 that the LSU 218 accessed the data cache 106. However, in order to ensure precise trap handling, the results from the hit cannot be written to the register file 216 until all other instructions in the instruction packet have completed. When a load hits in the C/A1 stage 334, its resultant data cannot be written to the register file 216 until the remaining execution stages have completed.

Figure 5:
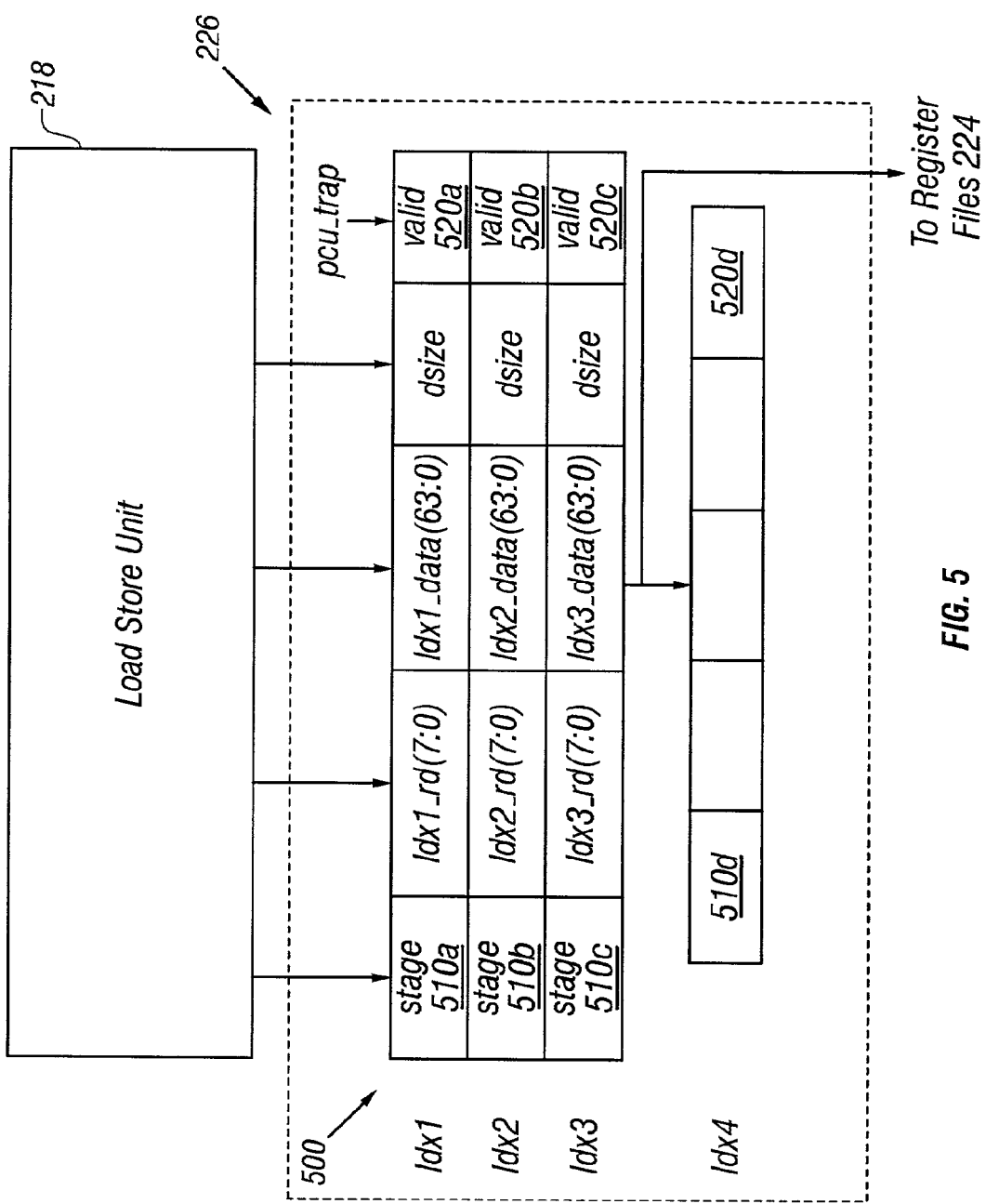
FIG. 5 is a schematic diagram illustrating a load/store unit and a pipe control unit that share information concerning load instructions.

If the load misses the data cache 106, the data returns from the LSU 218 to the PCU 226 only after the LSU 218 gets the data from the main memory interface 102 (FIG. 1). Thus, a load instruction remains in the load buffer of the LSU 218 until it retrieves its data. In contrast, all hits are transferred to the LDX 500 (FIG. 5). When the LSU 218 returns the load data to the PCU 226 after obtaining the data from main memory 102, the LSU 218 also returns to the PCU 226 the load instruction's scoreboard entry index 602.

Referring to FIG. 5, after load data is received by the PCU 226, it is not immediately written to the register files 224. To do so might cause data incoherence in a machine that executes load instructions speculatively and out of order. Instead, the load data and associated load information enters a load annex (LDX) 500. Load data is staged in the LDX 500 for a sufficient number of cycles so that the load instruction can reach the T pipeline stage before its data is broadcast to the register files 224. While load data is being staged in the LDX 500, the data is available to be bypassed to other functional units, as described below. The load data is broadcast to the register files in the T stage 360 if no trap was detected. Traps are detected in the T pipeline stage 360 (FIG. 3).

In at least one embodiment, the load data is staged in the LDX 500 for three stages before being broadcast to the register files 224. By staging the load data in the LDX 500 for three cycles, all the precise exceptions caused by either the load instruction itself or other instructions in the same or an older instruction packet as the load instruction will cause the load instruction to be canceled. That is, if a trap is detected before the load instruction reaches the WB stage 362, the valid bit for the load instruction is reset. When the load data is broadcast to the register files 224, the register files 224 latch the data locally and update the registers in the next clock cycle.

FIG. 5 illustrates that LDX 500 contains four entries labeled ldx1, ldx2, ldx3, and ldx4. These LDX entries act as a FIFO queue, with newer load data from the LSU 218 being placed in ldx1, and older load data being written to the register files 224 from ldx4. The registers 224 have a dedicated write port for load instructions, so the load data is shifted down one entry in the FIFO LDX 500 each clock cycle.

FIG. 5 illustrates that the LDX 500 includes four entries ldx1, ldx2, ldx3, and ldx4 even though the load data is only staged for three cycles (i.e., the A2, A3, and T stages). The fourth entry ldx4 is used to write the load data to the register files 224. Because load data cannot be accessed in the same cycle that it is being written to the register files 224, the additional ldx4 entry holds the load data while it is being written.

Each LDX entry ldx1, ldx2, ldx3, and ldx4 includes a stage field 510. This stage field 510 is derived from the value of the load buffer status word 410 associated with the LDX entry when it enters the PCU 226. The value of the stage field 510 indicates the age of the load instruction in the LDX entry. When the status word 410 for a particular load instruction is forwarded to the LDX 500, the C/A1 stage is no longer relevant. Instead, the load data was received by the LDX 500, at the earliest, during the C/A1 phase, so the LDX 500 need only track the age of the particular load instruction through the A2, A3, and T stages to ensure that the data from load instructions that hit in the data cache 106 are not written to the register files 224 until the particular load instruction has completed the T stage. Accordingly, the ldx1 stage of the annex 500 corresponds to the A2 stage 336 of the pipeline. Similarly, the ldx2 stage corresponds to the A3 stage 338 and the ldx3 stage corresponds to the T stage 360.

The stage bits in the four-bit status word 410 for the particular load instruction are therefore shifted right by one bit and the stage bits corresponding to the A2, A3, and T stages are placed in the 3-bit stage field 510 of the LDX entry associated with the particular load instruction. The PCU 226 detects the transition from one pipeline stage to the next. Upon each such transition, the PCU 226 shifts the stage bits in the stage field 510 to the right by one bit position. Because only one stage bit, at the most, is set for a load instruction at any one time, shifting to the right effectively resets the stage bit for the last stage and sets the stage bit for the current stage. The values of the stage field 510 for each pipeline stage that the LDX tracks is set forth below in Table 2.

TABLE 2

| Stage | Description |
|---|---|
| 1B'100' | Load data in A2 stage |
| 1B'010' | Load data in A3 stage |
| 1B'001' | Load data in T stage |
| 1B'000' | Load data in WB or after WB stage |

Table 2 illustrates that the sequential shift-right scheme for each successive transition from one pipeline stage to the other has the effect that all stage bits are reset for the WB stage 362 and any stages that occur after the load instruction has reached its WB stage 362. If a trap is detected before a load instruction reaches the WB stage 362, the load instruction is invalidated. In at least one embodiment, the valid bit 520 in the LDX entry is reset by the pcu_trap signal that indicates that the PCU 226 has detected a trap.

Each LDX entry ldx1, ldx2, ldx3, and ldx4 also includes a dsize field. The dsize field indicates whether the data associated with the load instruction is a 64-bit data word or a 32-bit data word.

The next two execution stages following the C/A1 stage 334, the A2 stage 336 and the A3 stage 338, are additional execution stages. For load instructions that have accessed the data cache 106 and returned their data during the C/A1 stage 334, the data is staged in the LDX 500 during the A2 and A3 stages 336, 338. The presence of trap conditions are detected by the PCU 226 in the T stage 360 of the load/store pipeline 300.

FIG. 3 illustrates that the two terminating stages of the load/store pipe 300 include a trap-handling stage 360 (T stage) and a write-back stage 362 (WB stage) during which result data is written-back to the register file 216. Processing of a load instruction during each of these stages is discussed in detail below.

FIG. 5 illustrates that, if the PCU 226 detects a trap, it generates a trap signal pcu_trap. This signal is used during the T stage 360 to reset the "valid" bit in the LDX entries for load instructions that are younger than the trapping instructions. In addition, the PCU 226 sends the pcu_trap signal to the LSU 218, and the LSU 218 then resets its valid bits 420A, 420B, 420C, 420D, 420E for any load instructions in the load buffer 400 that are younger than the trapping instruction. In the LDX 500, the load instruction will only be invalidated if it has not reached the WB 362 stage by the time the trap is detected. In other words, any load instruction that has reached the WB 362 stage may be written to the register files 224, regardless of its age, since it obviously was not canceled before or during the trap stage of its pipeline. During the WB stage 362, data from the T stage 360 of the load store/store pipeline 300 is broadcast to the register files 224. The register files 224 latch the data in WB-stage flip-flop latches (not shown) before writing the data.

While a load instruction is staged in an annex, its load data is made available to younger load instructions even though its load data has not yet been broadcast to the register files 224. This availability is sometimes referred to herein as "bypass." For purposes of example, assume that two sequential instructions each have the same destination register as follows:

load→ra (1)

add→ra (2)

Without bypass functionality, the add instruction (2) must stall until the load instruction (1) has reached the WB stage before the contents of register ra are available for the add instruction (2) to use. With bypass functionality, the add instruction (2) only stalls for two cycles. After the load instruction (1) is decoded in cycle 1, then the add instruction (2) is decoded in cycle 2. The scoreboard intercepts and stalls instructions that try to use results produced by a previous instruction that are not yet ready. Accordingly, due to the interlock, the add instruction (2) stalls in the D stage during cycles 3 and 4. One skilled in the art will recognize that, in alternative embodiments, the interlock functionality could be provided by software logic modules rather than hardware logic modules, or could be implemented as a combination of hardware and software logic modules.

Bypass functionality allows the add instruction (2) to have access to the load data from the load instruction (1) while the data is staged in the annex 500. With bypass functionality, the add instruction (2) is unstalled in cycle 4. In cycle 5, when the add instruction (2) is in its E stage, the load data is in the ldx2 stage.

FIGS. 6 and 7 illustrate that, in order to unlock the scoreboard entry for the load instruction (1) that has returned its load data, the PCU 226 utilizes the scoreboard entry index 602 that is returned from the LSU 218. The load instruction entry of the scoreboard 600 corresponding to the returned scoreboard entry index 602 is invalidated. This invalidation "unlocks" the scoreboard entry and allows the newer add instruction, which has a data dependency on the load instruction's data, to enter the scoreboard 600. Without using this indexed scoreboarding approach to unlock the scoreboard entry, each scoreboard entry for load or long latency instructions would have to be compared to the load instruction's (1) destination register, as load instructions may complete out of order and will not necessarily return their load data in the order reflected by the order of their entries in the scoreboard 600.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

For instance, one skilled in the art will recognize that the scoreboarding functionality described herein can be achieved with not only a hardware locking mechanism but also with a software locking mechanism, or a combination of software and hardware logic modules.

Also, for instance, while various embodiments have been described in conjunction with load instructions, one skilled in the art will recognize that the scoreboard indexing and validation discussed herein may also be used with other instructions, such as long latency instructions or other machine instructions. In such embodiments, rather than basing invalidation of the scoreboard entry upon return of load data, the invalidation is triggered by the appropriate terminating event associated with the particular instruction of interest.

Also, for instance, one skilled in the art will recognize that the indexed scoreboarding scheme described herein can be applied not only to normal load operations, but also to load group, load pair, load long, and other types of load instructions. The scheme can also be applied to other types of instructions that affect the data dependencies of younger instructions, such as a set internal register ("setir") instruction.

Also, for instance, the particular structure embodying the scoreboard may be implemented in any fashion that facilitates the functionality described herein. For instance, the scoreboard can be a single structure with separate entries for load and long latency instructions. In at least one alternative embodiment, separate scoreboard structures can be utilized for load/setir instructions and for long latency instructions.

What is claimed is:

1. A method for implementing a scoreboard for tracking dependencies between instructions executing on a processor, comprising:

associating an instruction with an index into the scoreboard, wherein the instruction is a load instruction, and wherein the scoreboard is maintained in a tangible form;

associating the instruction with a scoreboard entry corresponding to the index;

receiving an indication that a terminating event associated with the instruction has occurred, the received indication including a corresponding index into the scoreboard and the terminating event corresponding to receipt of load data associated with the load instruction; and identifying and invalidating, based on the received corresponding index, the scoreboard entry corresponding thereto, wherein the received corresponding index uniquely identifies the scoreboard entry corresponding to the instruction.

2. The method of claim 1 further comprises:
forwarding the instruction and the index to a load/store processing unit.

3. The method of claim 1 further comprises:
receiving the index from a load/store processing unit.

4. The method of claim 1, wherein the scoreboard entry is one of a plurality of scoreboard entries.

5. The method of claim 1, wherein the scoreboard entry corresponds to a register utilized by the instruction.

6. The method of claim 1, wherein the invalidating of the scoreboard entry facilitates unstalling of at least one dependent instruction.

7. The method of claim 1, wherein the scoreboard entry is not required to be compared to an associated destination register of the instruction prior to invalidation.

8. A method for tracking dependencies between instructions executing on a processor, comprising:
locating an entry in a scoreboard for an instruction with a scoreboard index returned from a load-store unit, wherein the instruction is a load instruction, and wherein the scoreboard is maintained in a tangible form; and
invalidating the located scoreboard entry, based on the returned scoreboard index, wherein the returned scoreboard index uniquely identifies the scoreboard entry corresponding to the instruction, and wherein the invalidating is responsive to receipt of data associated with the load instruction.

9. The method of claim 8 further comprising:
installing the instruction in the scoreboard entry;
associating the scoreboard index for the scoreboard entry with the instruction; and
indicating the associated scoreboard index and the instruction to the load-store unit.

10. The method of claim 8 further comprising maintaining the index and the instruction in the load-store unit at least until a terminating event that corresponds to the instruction.

11. The method of claim 8, wherein a second instruction that is dependent upon the instruction is stalled until the scoreboard index is returned from the load-store unit.

12. The method of claim 8, wherein the scoreboard entry corresponds to a register utilized by the instruction.

13. An apparatus comprising:
a scoreboard unit that includes a plurality of scoreboard entries configured to be indexed with scoreboard indices, the scoreboard unit configured to indicate in each entry validity information for an instruction, wherein the instruction is a load instruction; and
an execution stage unit configured to maintain scoreboard indices for respective instructions and to return scoreboard indices for use in locating and invalidating respective entries in the scoreboard unit, wherein the invalidating is responsive to receipt of data associated with the load instruction, and wherein the returned scoreboard indices uniquely identify a different one of the scoreboard entries which each correspond to a different instruction.

14. The apparatus of claim 13 further comprising a decode unit configurable to stall instructions dependent upon operands indicated in locked entries of the scoreboard unit.

15. The apparatus of claim 13, wherein each of the entries of the scoreboard unit correspond to registers utilized by the respective instructions.

* * * * *